United States Patent
Oh et al.

(10) Patent No.: US 12,498,613 B2
(45) Date of Patent: Dec. 16, 2025

(54) LIGHT PATH CONTROL DEVICE AND DISPLAY DEVICE INCLUDING THE SAME

(71) Applicant: LG Display Co., Ltd., Seoul (KR)

(72) Inventors: Youngmin Oh, Paju-si (KR); Hyunseung Kim, Paju-si (KR); Minhyung Kim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 336 days.

(21) Appl. No.: 18/448,468

(22) Filed: Aug. 11, 2023

(65) Prior Publication Data

US 2024/0201559 A1 Jun. 20, 2024

(30) Foreign Application Priority Data

Dec. 15, 2022 (KR) .................. 10-2022-0175699

(51) Int. Cl.
*G02F 1/29* (2006.01)
*G02B 5/18* (2006.01)

(52) U.S. Cl.
CPC ........... *G02F 1/292* (2013.01); *G02B 5/1814* (2013.01)

(58) Field of Classification Search
CPC ............................ G02F 1/292; G02B 5/1814
USPC .......................................................... 359/315
See application file for complete search history.

(56) References Cited

FOREIGN PATENT DOCUMENTS

| CN | 112711152 A | * | 4/2021 | .......... G02F 1/1347 |
|---|---|---|---|---|
| KR | 10-2022-0014096 A | | 2/2022 | |

* cited by examiner

*Primary Examiner* — William Choi
(74) *Attorney, Agent, or Firm* — Seed Intellectual Property Law Group LLP

(57) ABSTRACT

Embodiments relate to a light path control device, including a first viewing angle control member including light-shielding patterns patterned at regular intervals and a pattern cover layer to cover the light-shielding patterns; and a diffractive transmitting layer that is disposed on a lower portion of the first viewing angle control member and includes a plurality of slits, and a display device including the light path control device.

20 Claims, 14 Drawing Sheets

LIGHT PATH CONTROL DEVICE AND DISPLAY DEVICE INCLUDING THE SAME

CROSS REFERENCE TO RELATED APPLICATION

The present application claims priority to Korean Patent Application No. 10-2022-0175699, filed on Dec. 15, 2022, the entire contents of which is incorporated herein for all purposes by this reference.

BACKGROUND

Technical Field

The disclosure relates to a light path control device and a display device including the same.

Description of the Related Art

A light-shielding film can function as a light path control device that blocks light in a specific direction and transmits light in another specific direction by controlling the movement path of light according to the incident angle of outside light. Such a light-shielding film is attached to a display device used for a mobile phone, a notebook, a tablet PC, a vehicle navigation device, or the like, so that the light-shielding film can adjust a viewing angle of light when images are output from the display device or implement a clear image quality at a specific viewing angle.

As an example of the light-shielding film, there is one to which a method of controlling a light movement path through an arrangement of polymer dispersed liquid crystal (PDLC) is applied. In another example, the light-shielding film blocks or opens a light path through dispersion and aggregation of black electric behaved or otherwise responsive particles dispersed in a solvent. Private and share modes of the display device may be implemented using such a light-shielding film.

BRIEF SUMMARY

The disclosure provides a light path control device with improved front luminance and a display device including the same.

The disclosure provides a light path control device implementing a private mode and a share mode, and a display device including the same.

A light path control device according to one embodiment may include a first viewing angle control member including light-shielding patterns patterned at regular intervals and a pattern cover layer can encase, surround or otherwise cover and retain the light-shielding patterns and a diffractive transmitting layer that is disposed on a lower portion of the first viewing angle control member and includes a plurality of slits. The pattern cover layer can have a plurality of light transmissive regions positioned between the respective ones of the plurality of light shielding patterns.

The plurality of slits may be formed to induce diffraction of lights incident to the plurality of slits so that the diffracted lights cause constructive interference.

One or more slits may be disposed between adjacent light-shielding patterns.

The diffractive transmitting layer may include a metal material that reflects light.

The diffractive transmitting layer may include a reflection layer including the metal material and a transmitting layer that is disposed on an upper portion of the reflection layer and includes a light transmitting material.

The plurality of slits may be configured in long bars extending in parallel to each other or an extension line shape including one or more bent points, The light path control device may further include a light transmitting layer that is disposed between the diffractive transmitting layer and the first viewing angle control member and includes a light transmitting material.

The light path control device may further include a second viewing angle control member that is formed on an upper portion of the first viewing angle control member and includes a first electrode, a second electrode, and a liquid crystal layer interposed between the first electrode and the second electrode.

The light-shielding patterns may include a colored light absorbing material.

The light-shielding patterns may have a cross-section of a trapezoidal or inverted trapezoidal shape that varies a width along a vertical direction.

The light-shielding patterns may include a colored electric behaved or responsive particle dispersed in a dispersion solution.

The first viewing angle control member may further include a first electrode disposed on a lower side of the light-shielding patterns and a second electrode disposed on an upper side of the light-shielding patterns, the electric behaved particle, which may also be termed an electric response particle, may move in a direction of the first or second electrode according to an electric field formed between the first electrode and the second electrode.

The first viewing angle control member may further include a second electrode disposed on an upper side of the light-shielding patterns, the electric behaved particle may move in a direction of the diffractive transmitting layer or second electrode according to an electric field formed between the diffractive transmitting layer including a metal material and the second electrode.

A display device according to one embodiment may include a substrate, a backlight unit that is disposed on the substrate and generating light, a display panel that is disposed on the backlight unit and displays an image using the light provided from the backlight unit, and a light path control device that is interposed between the backlight unit and the display panel and controls an emission angle of the light incident from the backlight unit and provides the light to the display panel.

The light path control device may include a first viewing angle control member including light-shielding patterns patterned at regular intervals and a pattern cover layer to cover the light-shielding patterns and a diffractive transmitting layer that is disposed on a lower portion of the first viewing angle control member and includes a plurality of slits.

The plurality of slits may be formed to induce diffraction of lights incident to the plurality of slits so that the diffracted lights cause constructive interference.

One or more slits may be disposed between adjacent light-shielding patterns.

The diffractive transmitting layer may include a metal material that reflects light.

The backlight unit may include a light source member that generates light, a light guide plate that guides the light generated from the light source member to emit the light in a direction of the display panel, and a reflection layer disposed on a lower portion of the light guide plate, the light reaching the diffractive transmitting layer in which the slits are not formed from the backlight unit may be reflected by the diffractive transmitting layer and may proceed to the reflection layer, and the light reaching the reflection layer may be re-reflected and caused to reach the slits.

DETAILED DESCRIPTION

Figure 1:
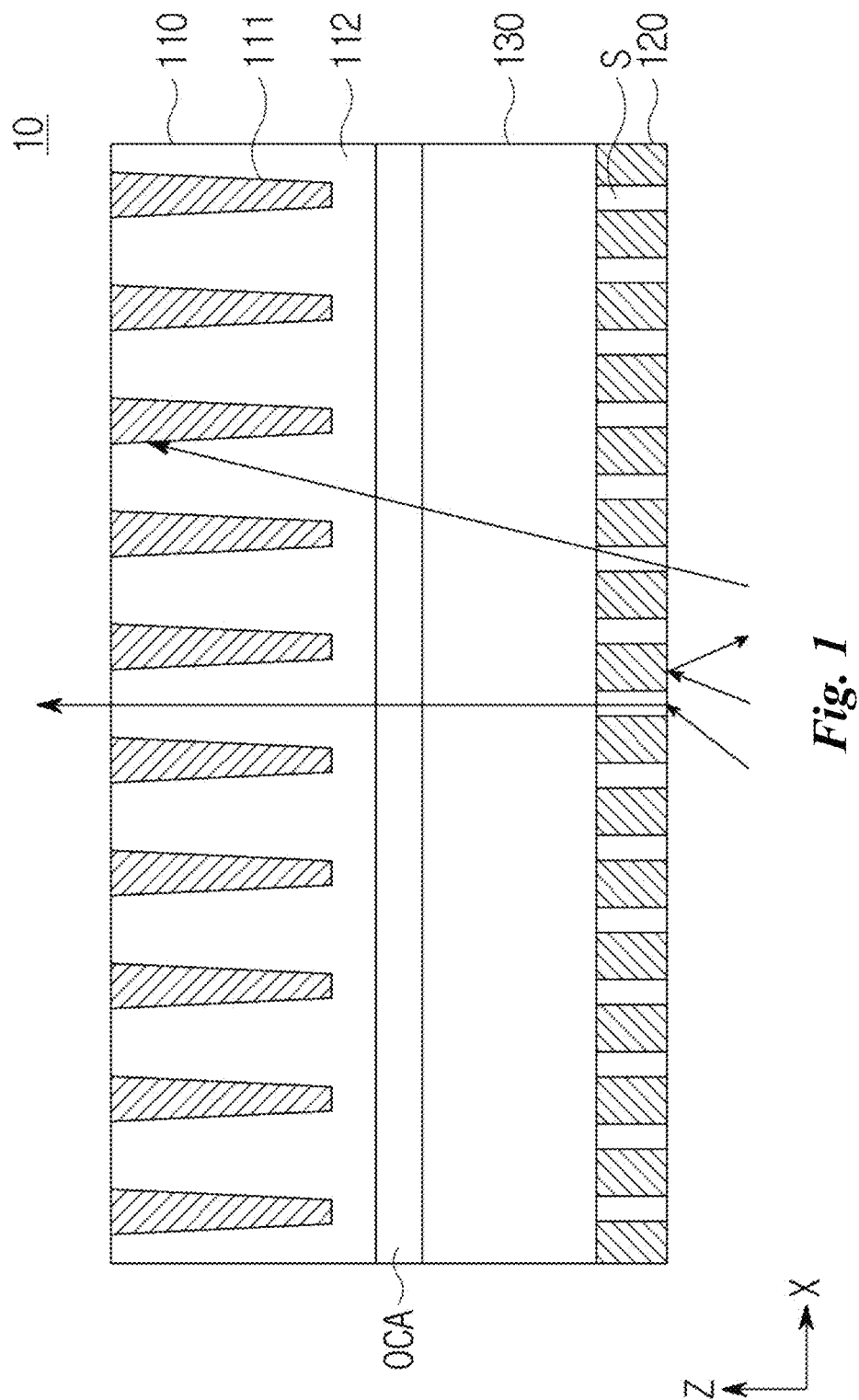
FIG. 1 is a cross-sectional view of a light path control device according to a first embodiment.

Hereinafter, embodiments of the present disclosure will be described with reference to the accompanying drawings. In this specification, when a component (or an area, layer, or portion, etc.) is referred to as being "on," "connected to," or "coupled to" another component, it means that the component can be directly connected/coupled to other components or that a third component can be disposed therebetween.

Like reference numerals refer to like elements. In addition, in the drawings, the thicknesses, proportions, and dimensions of components might be enlarged for effective description of technical content. The term "and/or" includes any combination of one or more that the associated configurations may define. The shapes, sizes, dimensions (e.g., length, width, height, thickness, radius, diameter, area, etc.), ratios, angles, number of elements, and the like illustrated in the accompanying drawings for describing the embodiments of the present disclosure are merely examples, and the present disclosure is not limited thereto. A dimension including size and a thickness of each component illustrated in the drawing are illustrated for convenience of description, and the present disclosure is not limited to the size and the thickness of the component illustrated, but it is to be noted that the relative dimensions including the relative size, location, and thickness of the components illustrated in various drawings submitted herewith are part of the present disclosure.

Terms such as first and second, etc., may be used to describe various elements, but the elements are not limited to the terms. The above terms are used only for the purpose of distinguishing one component from another component. For example, without departing from the scope of the present disclosure, the first component may be referred to as the second component. Similarly, the second component may also be referred to as the first component. A singular expression includes a plural expression unless the context clearly dictates otherwise.

Terms such as "under," "at a lower side." "on." "at an upper side" are used to describe the relationship of the components shown in the drawings. The above terms have relative concepts and are described with reference to directions indicated in the drawings.

Terms such as "comprise" or "have" are intended to designate that a feature, number, step, operation, component, part, or combination thereof described in the specification is present, and it should be understood that the terms do not preclude the possibility of addition or existence of one or more other features or numbers, steps, operations, components, parts, or combinations thereof.

Figure 2:
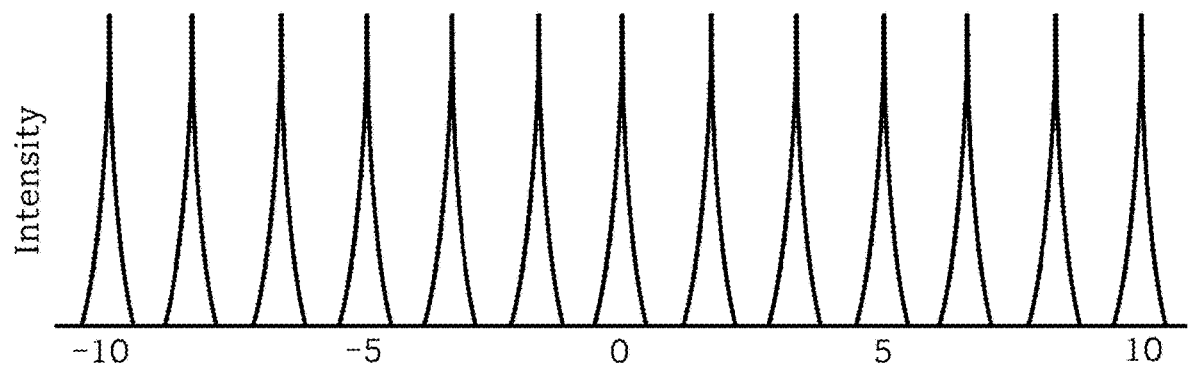
FIG. 2 is a diagram illustrating a luminance profile of a diffractive transmitting layer that includes a plurality of slits.
Figure 3:
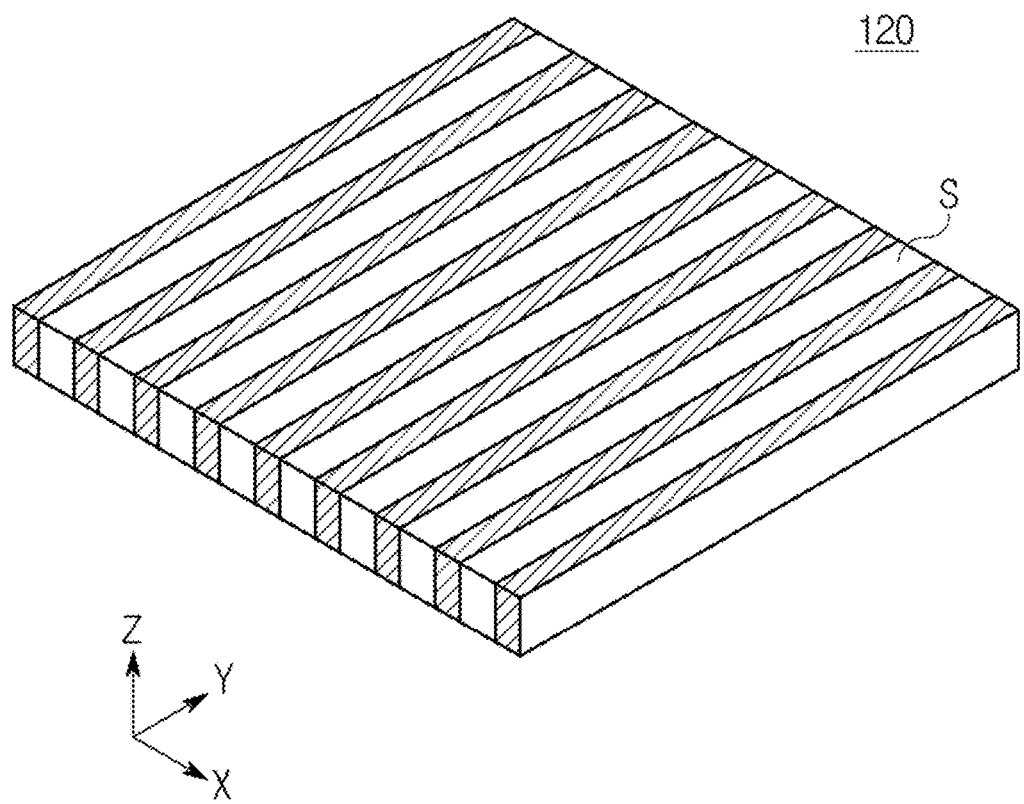
FIG. 3 is a perspective view of the diffractive transmitting layer illustrated in FIG. 1.
Figure 4A:
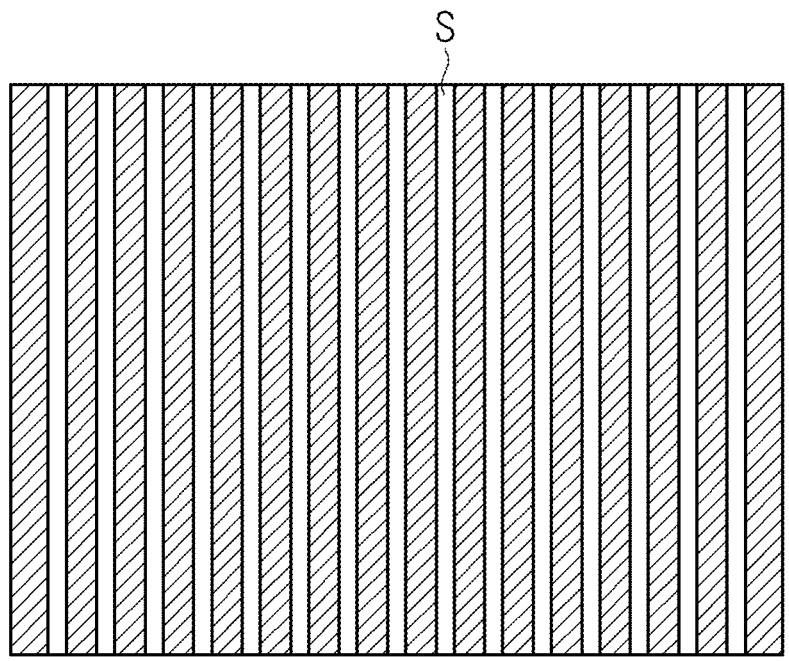
FIGS. 4A and 4B are plan views of different embodiments of the diffractive transmitting layer illustrated in FIG. 1.
Figure 4B:
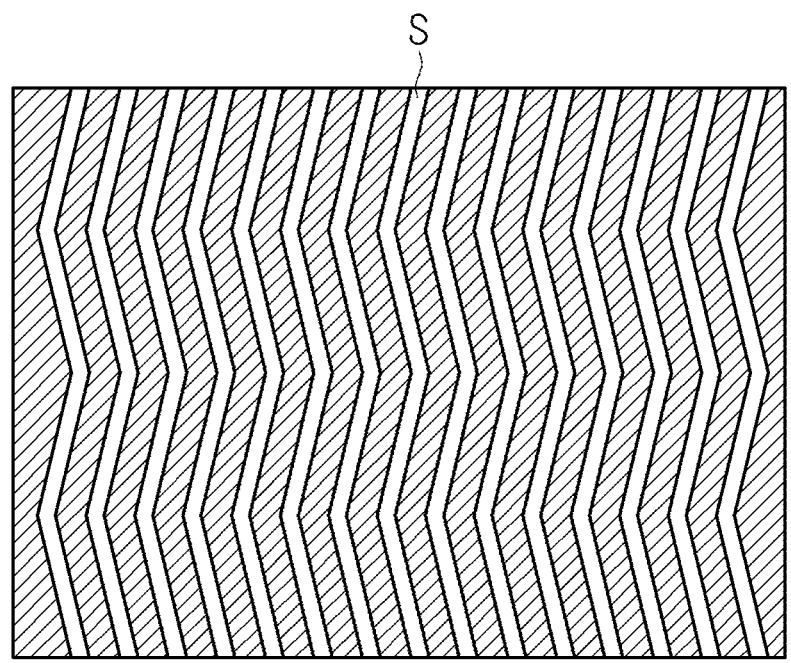

FIG. 1 is a cross-sectional view of a light path control device according to a first embodiment. FIG. 2 is a diagram illustrating a luminance profile of a diffractive transmitting layer that includes a plurality of slits, for example, of the type shown in FIG. 1. FIG. 3 is a perspective view of the diffractive transmitting layer illustrated in FIG. 1. FIGS. 4A and 4B are plan views of different embodiments of the diffractive transmitting layer illustrated in FIG. 1.

Referring to FIG. 1, a light path control device 10 may include a first viewing angle control member 110. The first viewing angle control member 110 may control a movement direction of light incident from the bottom region near the light transmitting layer 120.

The first viewing angle control member 110 may include light-shielding patterns 111 patterned at regular intervals. The light-shielding pattern 111 may have a bar shape elongated along the thickness direction Z of the first viewing angle control member 110.

The light-shielding pattern 111 may have a constant or variable width along the thickness direction (the vertical direction, Z). As illustrated in FIG. 1, the light-shielding pattern 111 may have, for example, a cross-section of an inverted trapezoidal shape where a width at an upper side is wider than a width at a lower side. However, the embodiment is not limited thereto, and in various other embodiments, the light-shielding pattern 111 may have a cross-section of a trapezoidal shape or may have a uniform overall width.

The light-shielding pattern 111 may be formed in the form of an accommodation groove shape that may or may not penetrate the first viewing angle control member 110. In the illustrated embodiment, the light-shielding pattern 111 has, for example, an accommodation groove shape formed on the upper surface of the first viewing angle control member 110.

The light-shielding pattern 111 may include a colored light absorbing material. This may be embedded in the control member 110. For example, the light-shielding pattern 111 may include electronic ink having black particles are embedded in control member 110.

A light path incident to the first viewing angle control member 110 is opened to the front through the interval between the light-shielding patterns 111 and blocked to the side by the light-shielding patterns 111. Accordingly, light incident to the first viewing angle control member 110 may be controlled within a narrow angle range with respect to the front of the first viewing angle control member 110.

A private mode blocking the side viewing angle and a share mode opening the side viewing angle may be implemented by controlling the side viewing angle according to the width and intervals of the light-shielding patterns 111. Accordingly, the width and intervals of the light-shielding patterns 111 may be appropriately designed in consideration of the range of viewing angles applied when implementing the private mode and the share mode.

A pattern cover layer 112 may protect the light-shielding pattern 111 and remove a step caused by the light-shielding pattern 111 to flatten the upper surface of the first viewing angle control member 110. The pattern cover layer 112 includes a transparent material having high transmittance. For example, the pattern cover layer 112 may include polyethylene terephthalate, polycarbonate, optical clear adhesive (OCA), UV resin, photoresist resin, urethane resin, acrylic resin, silicon oxide, or a combination of two or more thereof. The pattern cover layer 112 may transmit incident light in the opposite direction, that is, to the upper surface of the first viewing angle control member 110. The pattern cover layer 112 can surround, encase, enclose or otherwise support or retain the individual light-shielding patterns 111. The pattern cover layer can have a plurality of light transmissive regions positioned between the respective ones of the plurality of light shielding patterns.

In one embodiment, the light path control device 10 may include a diffractive transmitting layer 120. The diffractive transmitting layer 120 may be disposed on the lower portion of the first viewing angle control member 110. The diffractive transmitting layer 120 may be attached to one surface, e.g., the lower surface, of the first viewing angle control member 110 through an adhesive member such as optically clear adhesive (OCA).

The diffractive transmitting layer 120 is configured to diffract light incident from the bottom. Referring to FIGS. 3 and 4 together, the diffractive transmitting layer 120 may include a plurality of slits S.

The slits S may be through holes in which areas of the diffractive transmitting layer 120 are removed. The intervals between the slits S may be the same or variable throughout the diffractive transmitting layer 120. The slits S may have the same or different widths. In various embodiments, the slits S may have the same or different heights. In one embodiment, the interval between the slits S may be equal to or narrower than the interval between the light-shielding patterns 111, but the embodiment is not limited thereto. There are a light blocking members positioned between the slits, or stated differently, there are slits between light blocking members in the diffractive transmitting layer 120.

The diffractive transmitting layer 120 is designed to use interference of light due to diffraction by including the slits S. That is, the slits S are designed to induce diffraction of light incident to the slits S, so that the diffracted lights cause constructive interference.

Light enters the slits S in the diffractive transmitting layer 120 and passes thorough viewing angle control member 110 as shown by the arrows in FIG. 1. Light that does not align with the slits S in the diffractive transmitting layer 120 is blocked, absorbed or reflected, as is light that strikes one of the light-shielding patterns 111. Whether the light is blocked or absorbed or reflected will be determined based on the properties of the material used for the light-shielding patterns 111 and the diffractive transmitting layer 120. A display devise, such as a laptop computer, smart phone, tablet or the like can be the source of light for the arrows and positioned below the diffraction layer 120.

In one embodiment, the slits S may be formed in the shape of a long bar extending in parallel as illustrated in FIG. 4A. For example, the slits S may extend parallel to at least one side of the light path control device 10.

In another embodiment, the slits S may be configured in a zigzag shape or an extension line shape including one or more bent points, as illustrated in in FIG. 4B. In the embodiment, the slits S may extend non-parallel to the side of the light path control device 10. As illustrated in FIG. 4B, when the shape of the slit is complicated, the diffraction range and direction of light may become more diverse, which may be advantageous in improving front luminance.

The diffractive transmitting layer 120 may include a metal material having a high reflectance that reflects light. The diffractive transmitting layer 120 may include, for example, aluminum (Al), chromium (Cr), silver (Ag), aluminum (Al), or an alloy including at least one of these.

Figure 5:
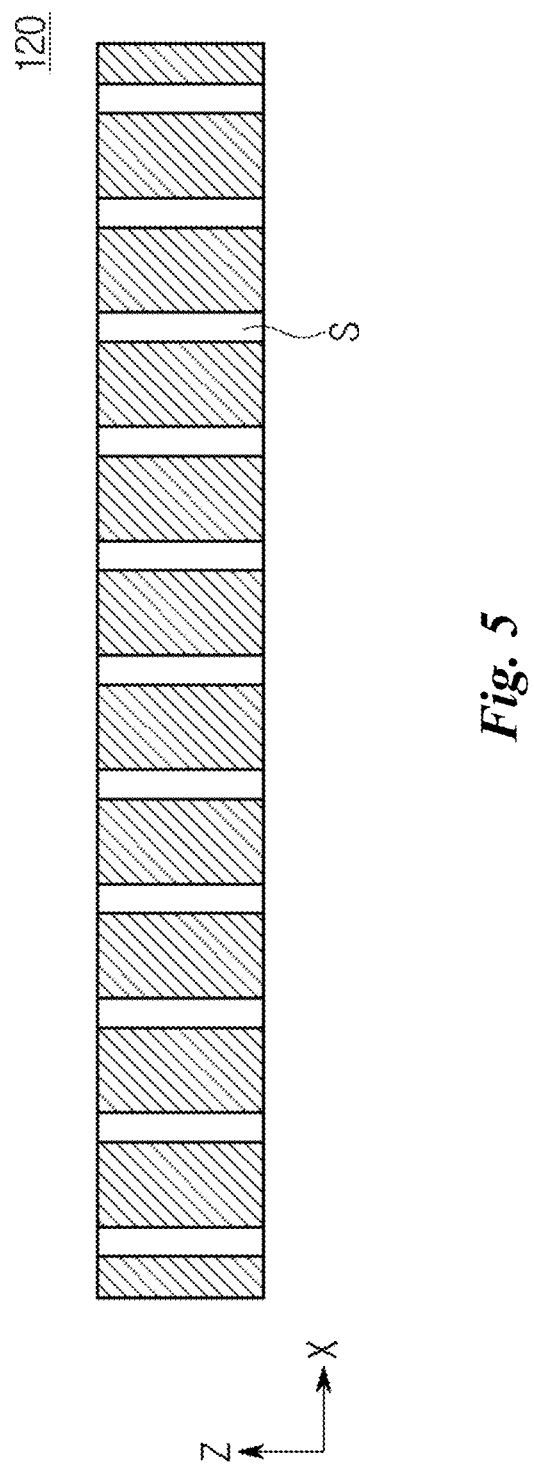
FIG. 5 is a cross-sectional view of a diffractive transmitting layer according to an embodiment.
Figure 6:
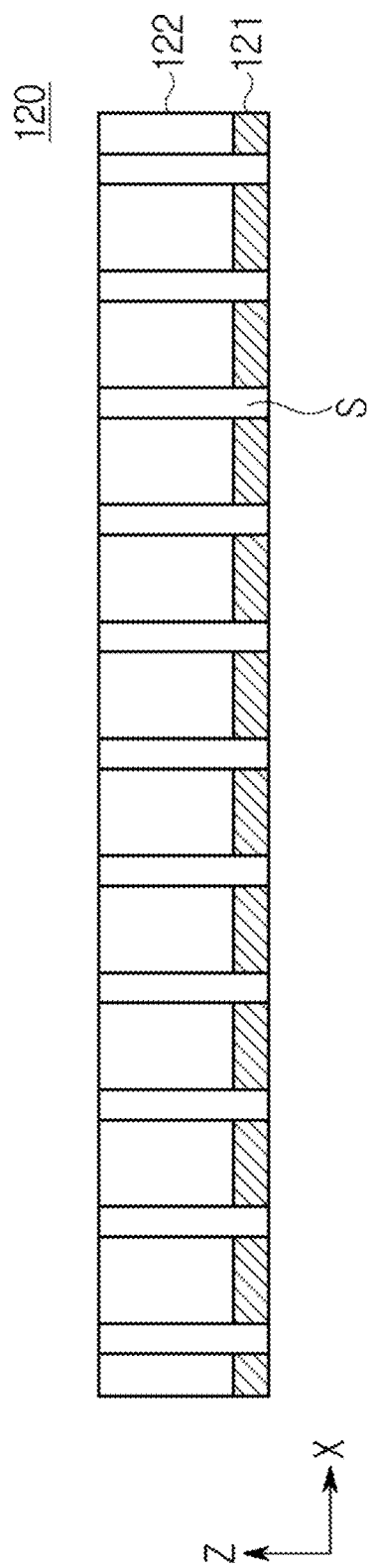
FIG. 6 is a cross-sectional view of a diffractive transmitting layer according to another embodiment.

In one embodiment, the diffractive transmitting layer 120 may include a single-layered structure of a metal material as illustrated in FIG. 5. In another embodiment, the diffractive transmitting layer 120 may include a double-layered structure of a reflection layer 121 and a transmitting layer 122 as illustrated in FIG. 6. In the embodiment, the reflection layer 121 includes a metal material. The transmitting layer 122 is disposed on the upper side of the reflection layer 121 and may include a material (light transmitting material) having high light transmittance, for example, polyethylene terephthalate (PET) or polymethyl methacrylate (PMMA), or the like.

Among the lights incident on the diffractive transmitting layer 120, light reaching the slit S is constructively interfered by diffraction while passing through the slit S. Accordingly, the intensity of light emitted upward is increased. The degree of diffraction of light may be determined by the intervals and width of the slits S. For example, as the interval between the slits S becomes narrower and the width of the slits S becomes narrower, the degree of diffraction may increase.

On the other hand, light reaching the diffractive transmitting layer 120 in which the slits S are not formed is reflected by the metal material of the diffractive transmitting layer 120 and proceeds to the reflection layer (e.g., a reflection layer formed on a backlight unit to be described later) formed on the lower portion of the diffractive transmitting layer 120. The light reaching the reflection layer may be re-reflected, reach the slit S, and be emitted upward. That is, in the embodiment, by configuring the diffractive transmitting layer 120 with a metal material having a high reflectance, light loss in the diffractive transmitting layer 120 can be minimized and the extraction efficiency of light applied to the upper layer can be further maximized.

In one embodiment, a light transmitting layer 130 may be further disposed between the diffractive transmitting layer 120 and the first viewing angle control member 110. The light transmitting layer 130 is optional and need not be present. It is shown as present in FIG. 1 and not present in FIG. 8. If present, it can have a thickness greater than the diffractive transmitting layer, as shown in FIG. 1, or thinner, FIG. 7. It may include a material having high light transmittance to minimize light loss, for example, polyethylene terephthalate (PET), polymethyl methacrylate (PMMA) or the like. In an embodiment in which the light transmitting layer 130 is disposed, the diffractive transmitting layer 120 may be formed on the lower surface of the light transmitting layer 130 by sputtering or the like. However, the method of forming the light transmitting layer 130 is not limited thereto.

Figure 7:
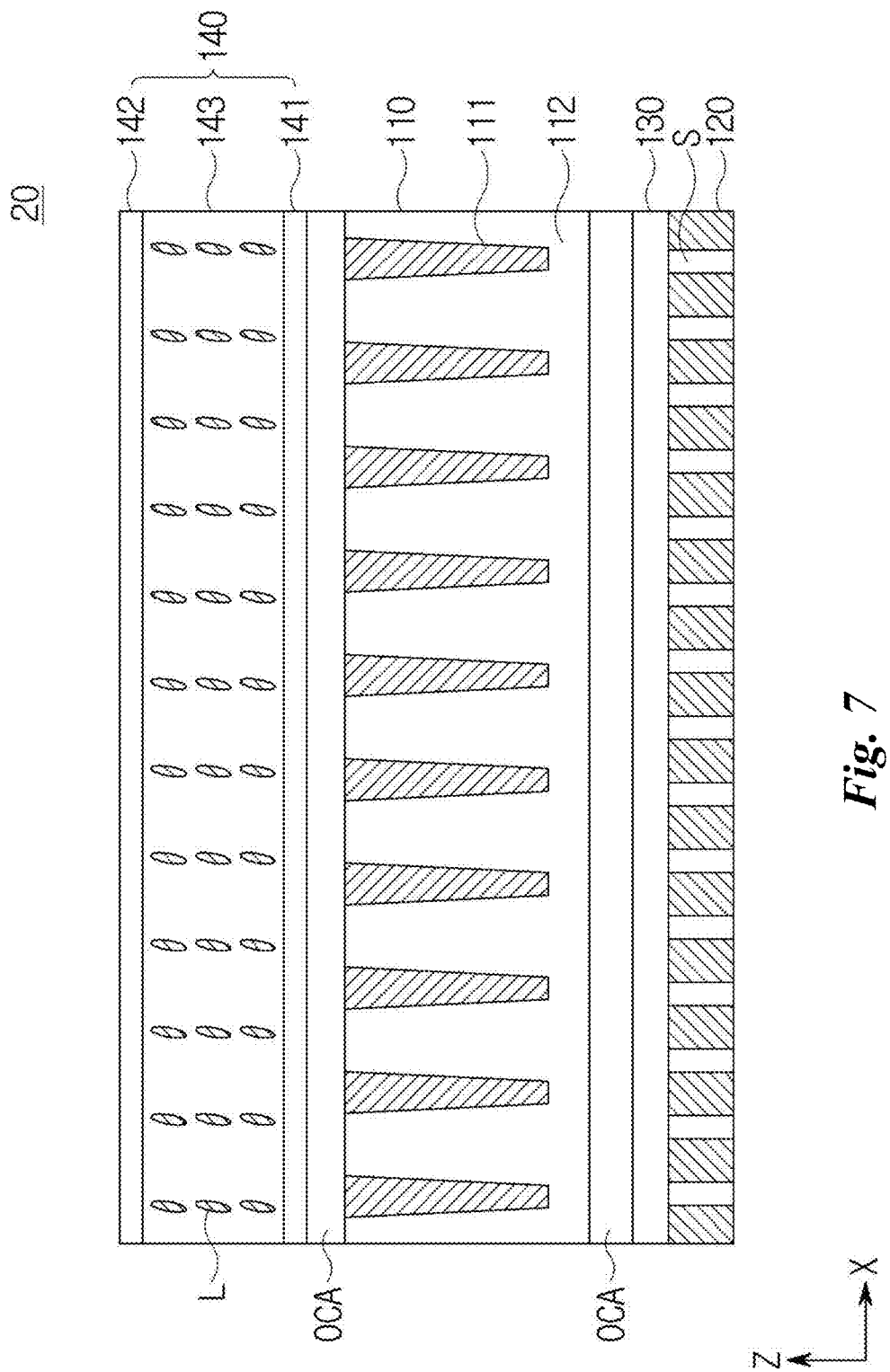
FIG. 7 is a cross-sectional view of a light path control device according to a second embodiment.

FIG. 7 is a cross-sectional view of a light path control device according to a second embodiment.

Referring to FIG. 7, a light path control device 20 further includes a second viewing angle control member 140.

The second viewing angle control member 140 is formed on the upper portion of the first viewing angle control member 110. The second viewing angle control member 140 may be attached to the first viewing angle control member 110 through an adhesive member such as optically clear adhesive (OCA). The second viewing angle control member 140 may control a movement direction of light incident from the first viewing angle control member 110.

For example, the second viewing angle control member 140 may be a polymer dispersed liquid crystal (PDLC) film. In the embodiment, the second viewing angle control member 140 may include a first electrode 141, a second electrode 142, and a liquid crystal layer 143 interposed therebetween.

The second viewing angle control member 140 may include a first electrode 141, a second electrode 142, and a liquid crystal layer 143 interposed therebetween.

The first electrode 141 may include a transparent conductive material. For example, the first electrode 141 may include indium tin oxide (ITO), indium zinc oxide (IZO), copper oxide, tin oxide, zinc oxide (ZnO), titanium oxide or the like. In one embodiment, the light transmittance of the first electrode 141 may be about 80% or more.

The second electrode 142 may include a transparent conductive material. The second electrode 142 may include the same or similar material as that of the first electrode 141. The second electrode 142 is disposed overlapping the first electrode 141. Accordingly, when a voltage is applied to the first electrode 141 and the second electrode 142, an electric field may be formed between them. A power source to generate the electric field can be provided and electrically coupled to the first and second electrodes.

The liquid crystal layer 143 may include liquid crystal molecules L. The liquid crystal molecules L are arranged in an initial molecular direction through an alignment layer (not illustrated), etc., and when an electric field is formed between the first electrode 141 and the second electrode 142, the liquid crystal molecules L may be arranged in a specific molecular direction according to the electric field direction. As a result, the refractive index of the liquid crystal layer 143 changes. An emission path of light incident from the first viewing angle control member 110 to the second viewing angle control member 140 may be controlled according to the change in the refractive index of the liquid crystal layer 143.

Figure 8:
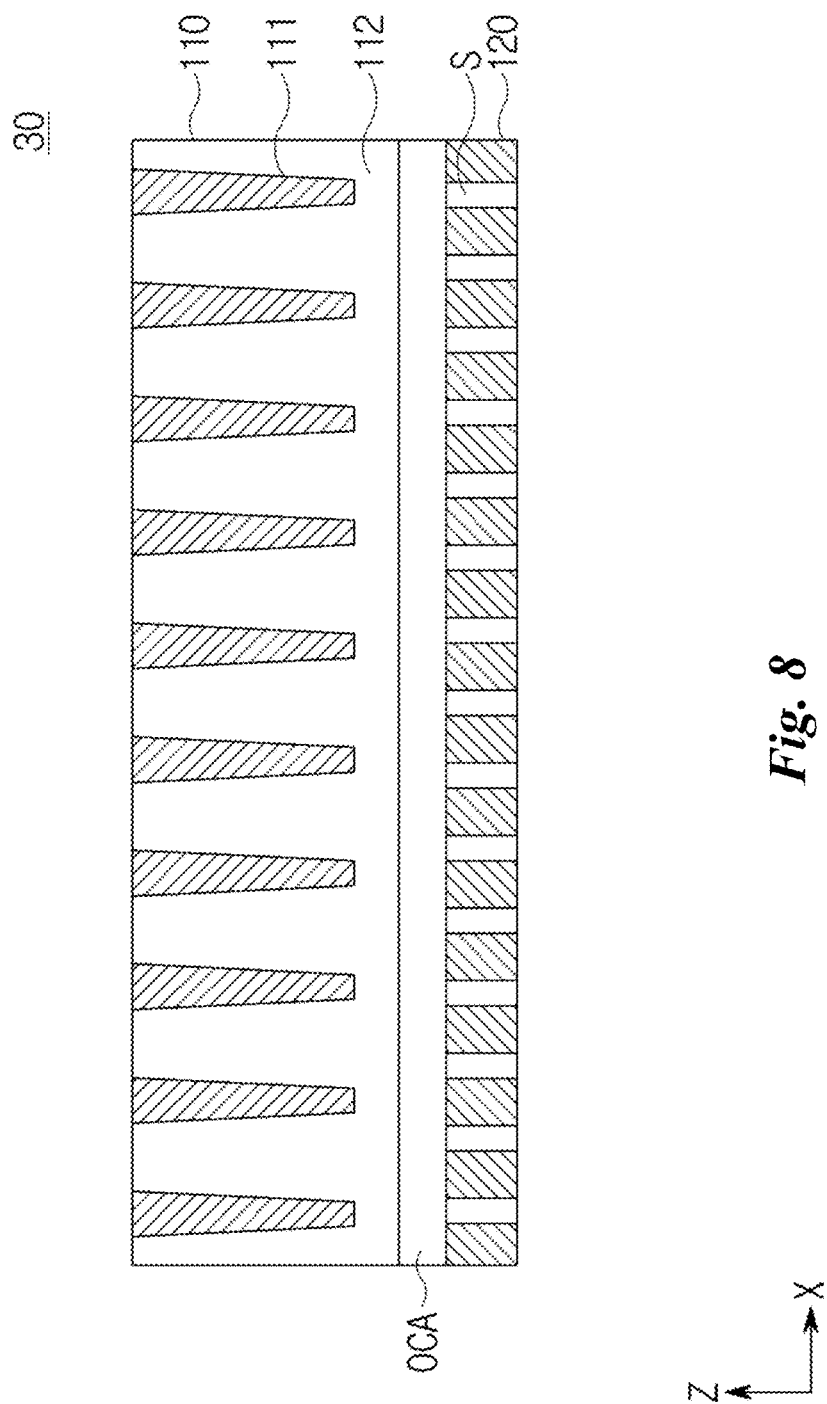
FIG. 8 is a cross-sectional view of a light path control device according to a third embodiment.

FIG. 8 is a cross-sectional view of a light path control device according to a third embodiment.

Referring to FIG. 8, in an optical light path control device 30, the light transmitting layer 130 between the diffractive transmitting layer 120 and the first viewing angle control member 110 is omitted. Accordingly, the thickness of the light path control device 30 may be reduced, process complexity may be reduced, and process cost may be reduced.

Figure 9:
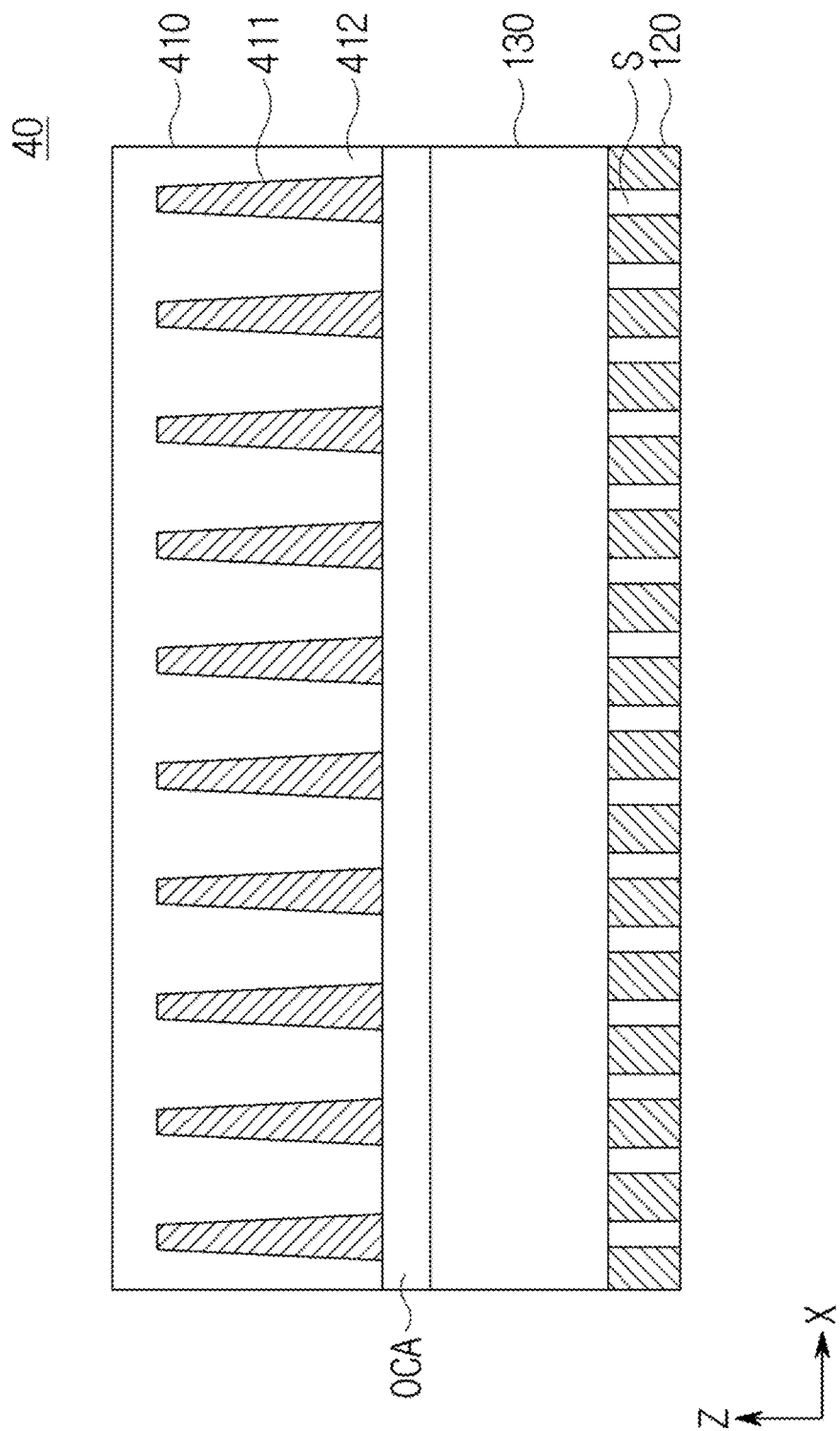
FIG. 9 is a cross-sectional view of a light path control device according to a fourth embodiment.

FIG. 9 is a cross-sectional view of a light path control device according to a fourth embodiment.

Referring to FIG. 9, in a light path control device 40, a light-shielding pattern 411 of a first viewing angle control member 410 has a variable width along the thickness direction Z. In this case, the light-shielding pattern 411 may have a cross-section of a trapezoidal shape in which a width at an upper side is narrower than a width at a lower side. pattern cover layer 512

In the embodiment, the light-shielding pattern 411 may be formed in the form of an accommodation groove shape that may or may not penetrate and be embedded in the first viewing angle control member 410 that is in the pattern cover layer 412. In the illustrated embodiment, the light-shielding pattern 411 has an accommodation groove shape is formed on and extends upward from the lower surface of the first viewing angle control member 410.

In this way, in various embodiments, the shape of the light-shielding pattern 411 is not particularly limited as long as it can block at least a portion of side emission of light incident from the bottom. Accordingly, the light-shielding pattern 411 may be implemented adaptively in various ways according to the shape, type, profile, etc. of a display device to which the light path control device 40 is to be applied.

Figure 10:
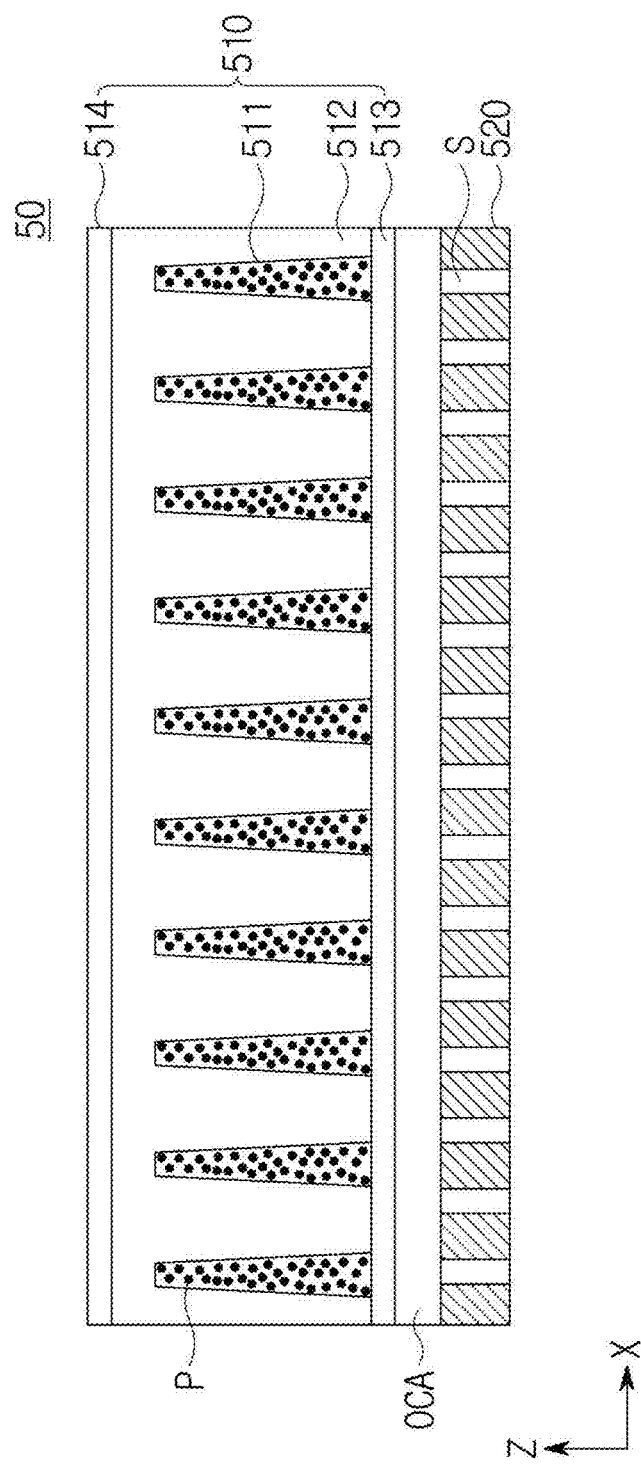
FIGS. 10 and 11 are cross-sectional views of a light path control device according to a fifth embodiment.
Figure 11:
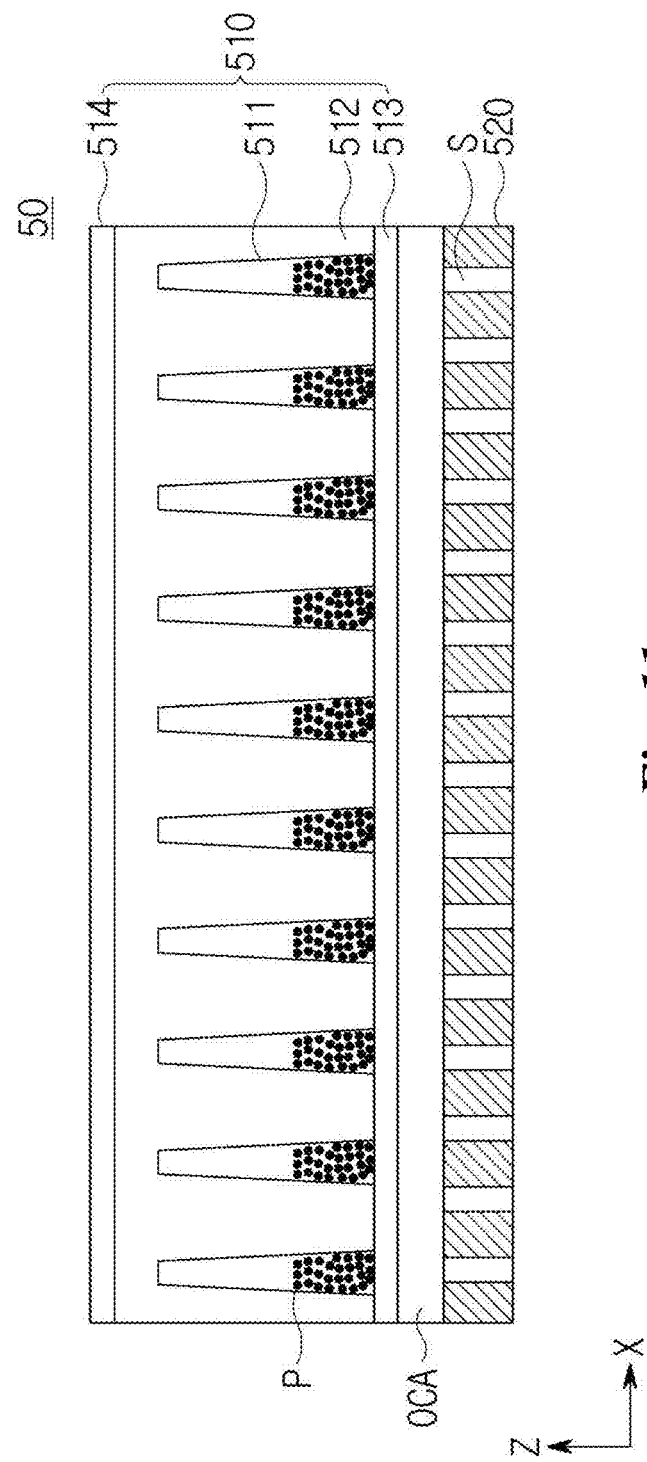

FIGS. 10 and 11 are cross-sectional views of a light path control device according to a fifth embodiment.

Referring to FIG. 10, a light path control device 50 includes a first viewing angle control member 510. The first viewing angle control member 510 may control a movement direction of light incident from the bottom.

The first viewing angle control member 510 may include light-shielding patterns 511 patterned at regular intervals. The light-shielding pattern 511 may have a bar shape elongated along the thickness direction Z of the first viewing angle control member 510.

The light-shielding pattern 511 may have a constant or variable width along the thickness direction Z. For example, as illustrated in FIG. 10, the light-shielding pattern 511 may have a cross-section of a trapezoidal shape in which a width at an upper side is narrower than a width at the lower side.

The light-shielding pattern 511 may be formed in the form of an accommodation groove shape that may or may not penetrate the first viewing angle control member 510. For example, in the illustrated embodiment, the light-shielding pattern 511 has an accommodation groove shape formed on the lower surface of the first viewing angle control member 510. That is, the light-shielding patterns 511 may be configured in the form of accommodation grooves formed in a pattern cover layer 512.

In the embodiment, the light-shielding pattern 511 may include suspended particles P dispersed in a dispersion solution. That is, the dispersion solution may be filled in the light-shielding pattern 511, and the suspended particles P may be dispersed in the dispersion solution. The dispersion solution is a solvent in which the suspended particles P are dispersed, and may be a transparent and low-viscosity insulating solvent. For example, the dispersion solution may include at least one of halocarbon-based oil, paraffin-based oil, and isopropyl alcohol. The suspended particles P may be colored electric behaved particles, for example, black particles. The suspended particles P may be carbon black particles, but are not limited thereto.

In the embodiment, the first viewing angle control member 510 may include a first electrode 513 and a second electrode 514. The electrodes 514 and 513 are not necessarily to scale in these images and might be shown enlarged in the figures for ease in illustration purposes.

The first electrode 513 may be disposed on one side, for example, the lower side of the light-shielding pattern 511. In other words, the first electrode 513 may be provided on the lower side of the pattern cover layer 512 on which the light-shielding pattern 511 is formed. The first electrode 513 may be disposed in the form of a surface electrode or a patterned electrode.

The first electrode 513 may include a transparent conductive material. For example, the first electrode 513 may include indium tin oxide (ITO), indium zinc oxide (IZO), copper oxide, tin oxide, zinc oxide (ZnO), titanium oxide, or the like. In one embodiment, the light transmittance of the first electrode 513 may be about 80% or more. Then, the first electrode 513 is not visible from the outside, the light transmittance is increased, and the luminance of the light path control device 50 can be improved.

In another embodiment, the first electrode 513 may include various metals to implement low resistance. For example, the first electrode 513 may include at least one metal from chromium (Cr), nickel (Ni), copper (Cu), aluminum (Al), silver (Ag), molybdenum (Mo), gold (Au), titanium (Ti), and alloys thereof.

The second electrode 514 may be disposed on the other side, e.g., the upper side, of the light-shielding pattern 511. In other words, the second electrode 514 may be provided on the upper side of the pattern cover layer 512 on which the light-shielding pattern 511 is formed. The second electrode 514 may be disposed in the form of a surface electrode or a patterned electrode.

The second electrode 514 may include the same or similar material as that of the first electrode 513. The second electrode 514 is disposed so as to overlap the first electrode 513 at least in part or in its entirety or at least be adjacent to the first electrode 513. Accordingly, when a voltage is applied to the first electrode 513 and the second electrode 514, an electric field may be formed therebetween.

The light-shielding pattern 511 may be electrically connected to the first electrode 513 and the second electrode 514, and the arrangement state of the charged suspended particles P may be controlled according to a voltage difference between the first electrode 513 and the second electrode 514. Depending on the arrangement state of the suspended particles P, the first viewing angle control member 510 may implement a light transmitting mode and a light shielding mode.

Specifically, when voltage is not applied to the first electrode 513 and the second electrode 514, as illustrated in FIG. 10, the suspended particles P are uniformly dispersed in the dispersion solution, so that the light shielding mode in which the transmission of outside light is blocked is implemented. Here, the outside light applied to the light-shielding pattern 511 may pass through the first viewing angle control member 510, so that emission light may be viewed from the front of the light path control device 50. That is, the light path control device 50 may implement a private mode in which the field of view is opened for a specific viewing angle (e.g., front viewing angle) and the field of view is blocked for other viewing angles (e.g., side viewing angle).

When a voltage is applied to at least one of the first electrode 513 and the second electrode 514, as illustrated in FIG. 11, the suspended particles P may move in the direction of the first electrode 513 or second electrode 514 by the electric field. Here, the movement direction of the suspended particle P may be controlled according to the polarity (negative electrode or positive electrode) of the suspended particle P and the relative magnitudes of the voltages applied to the first electrode 513 and the second electrode 514.

When the suspended particles P are aggregated around the first electrode 513 or the second electrode 514, outside light is transmitted through the dispersion solution and the pattern cover layer 512, so that a light transmitting mode can be implemented. That is, the light path control device 50 may implement a share mode in which the field of view is open to both the front and side surfaces. When the voltage applied to the electrode 513 causes the particles P to aggregate towards it, the area being blocked by the light-shielding pattern 511 is reduced and the viewing angle is greatly increased. The amount of increase in the viewing angle can be controlled based on the strength of the field or signal applied to the electrodes 513 and 514 by a power source. Any known power supply can be the power source, of which many acceptable ones are known in the art. If a small or moderate field or signal is applied, the particles P will move a small or moderate amount towards the electrode 513, increasing the viewing angle in the shared mode by a small or moderate amount. As the signal applied becomes greater, as shown in FIG. 11, the particles P are drawn closer to the electrode 513 and the shared viewing angle is further increased. If an even stronger signal is applied, then all of the particles P can be quite close to the electrode 513 and the screen can be viewed from almost any angle since it will have a large shared angle.

A diffractive transmitting layer 520 may be disposed on the lower portion of the first viewing angle control member 510. The diffractive transmitting layer 520 may be attached to one surface, e.g., the lower surface, of the first viewing angle control member 510 through an adhesive member such as optically clear adhesive (OCA).

The diffractive transmitting layer 520 is configured to diffract light incident from the bottom. The diffractive transmitting layer 520 may include a plurality of slits S. The slits S may be through holes obtained by removing areas of the diffractive transmitting layer 520. The intervals between the slits S may be the same or variable throughout the diffractive transmitting layer 520. The slits S may have the same or different widths. In various embodiments, the slits S may have the same or different heights. The diffractive transmitting layer 520 is designed to use interference of light due to diffraction by including the slits S.

The diffractive transmitting layer 520 may include a metal material having high reflectivity. For example, the diffractive transmitting layer 520 may include aluminum (Al), chromium (Cr), silver (Ag), aluminum (Al), an alloy including at least one of these or the like.

In one embodiment, a light transmitting layer 530 may be further disposed between the diffractive transmitting layer 520 and the first viewing angle control member 510. The light transmitting layer 530 may include a material having high light transmittance, for example, polyethylene terephthalate (PET), polymethyl methacrylate (PMMA) or the like in order to minimize light loss.

Figure 12:
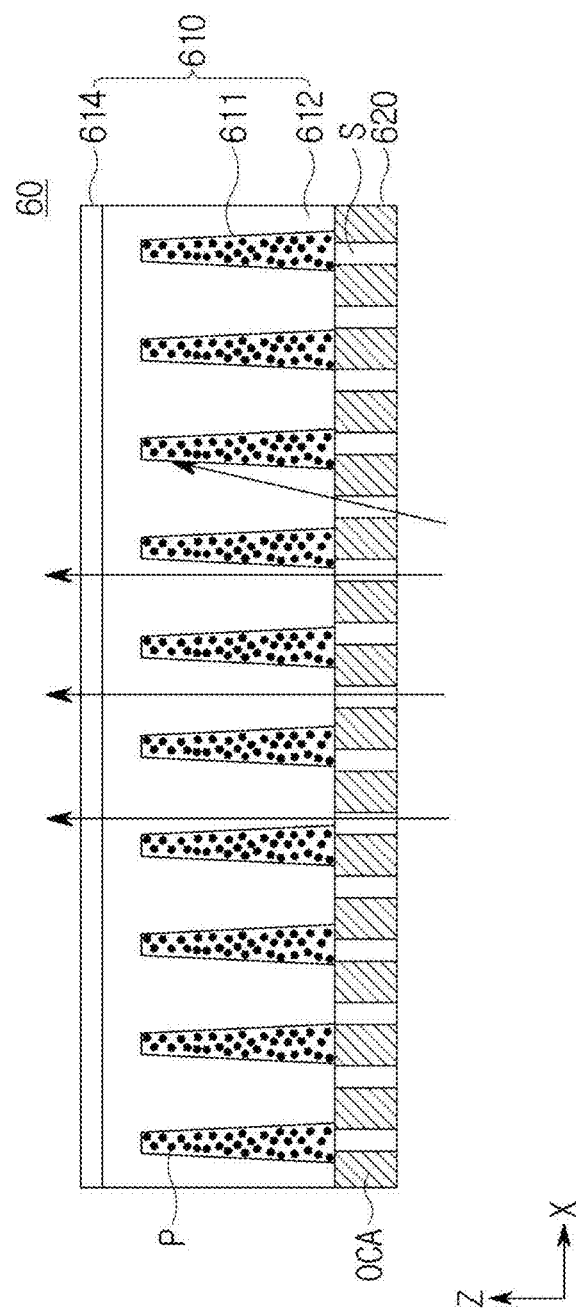
FIG. 12 is a cross-sectional view of a light path control device according to a sixth embodiment.

FIG. 12 is a cross-sectional view of a light path control device according to a sixth embodiment.

Referring to FIG. 12, a first viewing angle control member 610 of a light path control device 60 includes a light-shielding pattern 611 including suspended particles P as electric behaved particles, and a second electrode 614 formed on the upper side of the light-shielding pattern 611.

Compared to the embodiment illustrated in FIG. 10, in the embodiment illustrated in FIG. 12, the diffractive transmitting layer 620 replaces the function of the first electrode 513 of the first viewing angle control member 610. The diffractive transmitting layer 620 can have electrically conductive members that perform the function of the blocking members and thus can act as electrodes.

Specifically, the first viewing angle control member 610 may include the light-shielding patterns 611 patterned at regular intervals. The light-shielding pattern 611 may have a bar shape elongated along the thickness direction Z of the first viewing angle control member 610.

The light-shielding pattern 611 may have a constant or variable width along the thickness direction Z. For example, as illustrated in FIG. 12, the light-shielding pattern 611 may have a cross-section of a trapezoidal shape in which a width at an upper side is narrower than a width at a lower side.

The light-shielding pattern 611 may be formed in the form of an accommodation groove shape that may or may not penetrate the first viewing angle control member 610. For example, in the illustrated embodiment, the light-shielding pattern 611 has an accommodation groove shape formed on the lower surface of the first viewing angle control member 610. That is, the light-shielding patterns 611 may be configured in the form of accommodation grooves formed in the pattern cover layer 612.

In the embodiment, the light-shielding pattern 611 may include suspended particles P dispersed in the dispersion solution. That is, the light-shielding pattern 611 may be filled with the dispersion solution, and the suspended particles P may be dispersed in the dispersion solution. The dispersion solution is a solvent in which the suspended particles P are dispersed, and may be a transparent and low-viscosity insulating solvent. For example, the dispersion solution may include at least one of halocarbon-based oil, paraffin-based oil, and isopropyl alcohol. The suspended particles P may be colored electric behaved particles, for example, black particles. The suspended particles P may be carbon black particles, but are not limited thereto.

In the embodiment, the first viewing angle control member 610 may include a second electrode 614.

The second electrode 614 may be disposed on the other side, e.g., the upper side, of the light-shielding pattern 611. In other words, the second electrode 614 may be provided on the upper side of the pattern cover layer 612 on which the light-shielding pattern 611 is formed. The second electrode 614 may be disposed in the form of a surface electrode or a patterned electrode.

The second electrode 614 may include a transparent conductive material. For example, the second electrode 614 may include indium tin oxide (ITO), indium zinc oxide (IZO), copper oxide, tin oxide, zinc oxide (ZnO), titanium oxide or the like. In one embodiment, the light transmittance of the second electrode 614 may be about 80% or more. Then, the second electrode 614 is not visible from the outside, light transmittance is increased, and luminance of the light path control device 60 may be improved.

In another embodiment, the second electrode 614 may include various metals to implement low resistance. For example, the second electrode 614 may include at least one metal from chromium (Cr), nickel (Ni), copper (Cu), aluminum (Al), silver (Ag), molybdenum (Mo), gold (Au), titanium (Ti), and alloys thereof.

A diffractive transmitting layer 620 may be disposed on the lower portion of the first viewing angle control member 610. The diffractive transmitting layer 620 is configured to diffract light incident from the bottom. The diffractive transmitting layer 620 may include a plurality of slits S. The slits S may be through holes in which areas of the diffractive transmitting layer 620 are removed. The intervals between the slits S may be the same or variable throughout the diffractive transmitting layer 620. The slits S may have the same or different widths. In various embodiments, the slits S may have the same or different heights. The diffractive transmitting layer 620 is designed to use interference of light due to diffraction by including the slits S. Light enters at the bottom of diffractive transmitting layer 620 as shown by the arrows and where both a slit and a space between light-shielding patterns 611 are present, passes out of the structure. Where either a light-shielding pattern 611 or blocking member in the diffractive transmitting layer 620 is present, the light does not pass through the light path control device 60.

The diffractive transmitting layer 620 may include a metal material having high reflectivity. For example, the diffractive transmitting layer 620 may include aluminum (Al), chromium (Cr), silver (Ag), aluminum (Al), or an alloy including at least one of these.

In particular, in the embodiment, the diffractive transmitting layer 620 may include a metal material having high electrical conductivity. In this case, the light-shielding pattern 611 may be electrically connected to the diffractive transmitting layer 620 and the second electrode 614, and the arrangement state of the charged suspended particles P may be controlled according to the voltage difference between the diffractive transmitting layer 620 and the second electrode 614. Depending on the arrangement state of the suspended particles P, the first viewing angle control member 610 may implement a light transmitting mode and a light shielding mode.

As the mode of the first viewing angle control member 610 is controlled using the diffractive transmitting layer 620, in this embodiment, the thickness of the light path control device 60 can be reduced, the front luminance is improved through the diffractive transmitting layer 620, and at the same time, the light transmitting mode and the light shielding mode may be implemented in a switchable manner through the first viewing angle control member 610.

Figure 13:
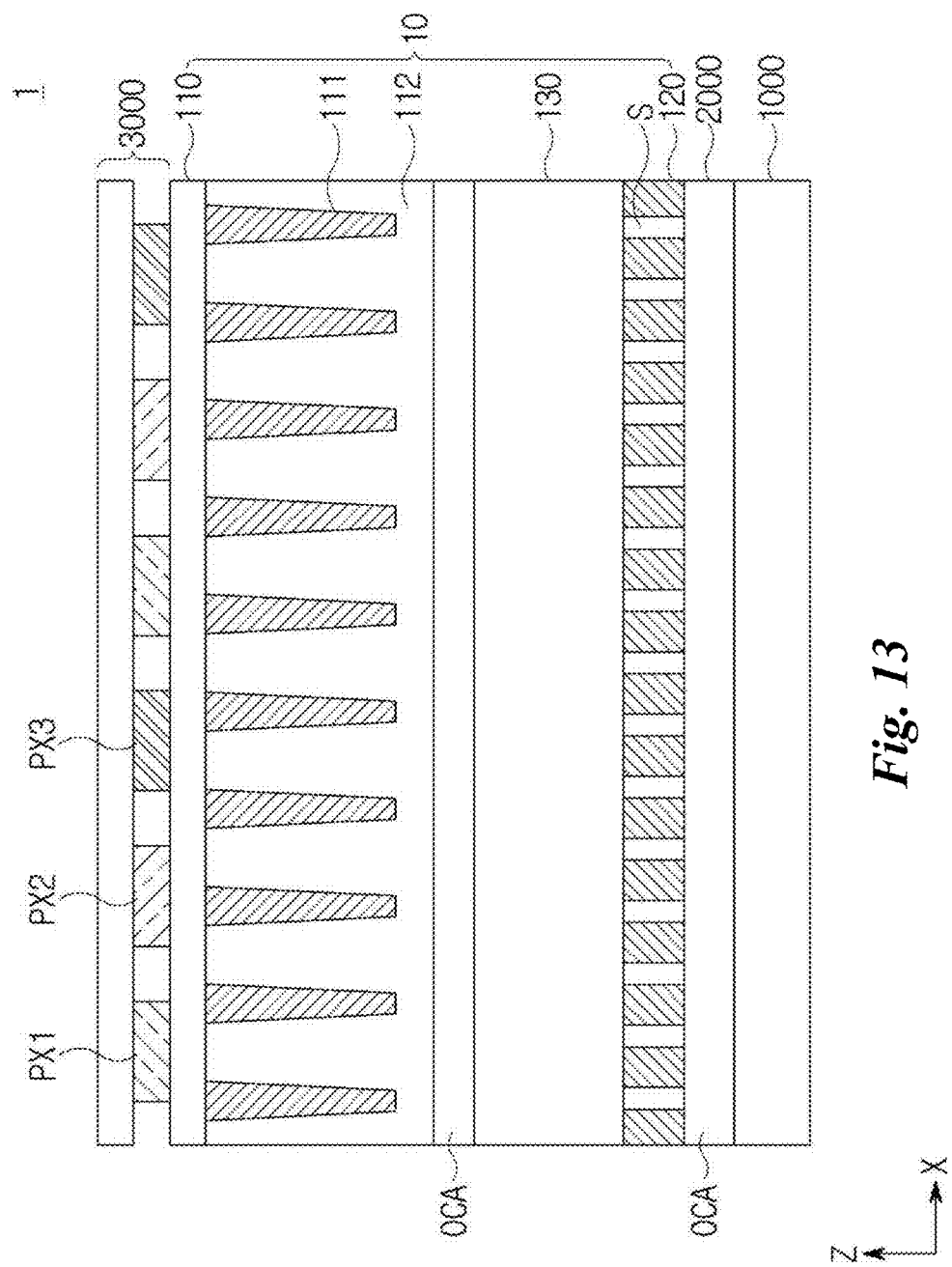
FIG. 13 is a cross-sectional view of a display device including a light path control device according to an embodiment.

FIG. 13 is a cross-sectional view of a display device including a light path control device according to an embodiment.

Referring to FIG. 13, a display device 1 according to an embodiment may include a substrate 1000, a backlight unit 2000, a light path control device 10 and a display panel 3000.

The substrate 1000 is a base substrate of the display device 10 and may be a light-transmitting substrate. The substrate 1000 may be a rigid substrate including glass or tempered glass or a flexible substrate made of plastic. For example, the substrate 1000 is a flexible substrate film, and may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI), and polystyrene (PS). However, the material of the substrate 1000 is not limited thereto.

The backlight unit 2000 may be disposed on the substrate 1000 and may generate and emit light upward. The backlight unit 2000 may provide light to the display panel 3000. For example, the backlight unit 2000 may include a light source member and a light guide plate. The light source member may be disposed on one side of the light guide plate to generate and emit light, and the light guide plate may guide the light generated from the light source member to emit light in a direction of the display panel 3000.

In one embodiment, the backlight unit 2000 may include, for example, a reflection layer disposed on a lower surface of the light guide plate. The reflection layer may minimize light loss by reflecting the light that is generated from the light source member and leaks to the lower portion of the backlight unit 2000 upward.

The display panel 3000 is configured to display an image using the light provided from the backlight unit 2000. For example, the display panel 3000 may be a liquid crystal panel including a liquid crystal layer interposed between two substrates. Here, the liquid crystal layer may include a liquid crystal of IPS mode, ECB mode or TN mode.

The display panel 3000 may display images of various colors including a plurality of pixels PX1, PX2, and PX3. For example, the display panel 3000 may include first pixels PX1 representing a first color, second pixels PX2 representing a second color, and third pixels PX3 representing a third color. In one embodiment, the first to third colors may include red, green, and blue, but are not limited thereto. For example, the first to third colors may include white, and may include yellow, magenta, and cyan.

The light path control device 10 is disposed between the backlight unit 2000 and the display panel 3000. The light path control device 10 controls an emission angle of light incident from the backlight unit 2000 and provides the controlled light to the display panel 3000. The light path control device 10 may be, for example, the light path control device 10 described with reference to FIG. 1. In other embodiments, the light path control device 10 may be the light path control devices described with reference to FIGS. 5 to 12.

The display device 1 may selectively operate according to either a private mode or a share mode through the light path control device 10.

Figure 14A:
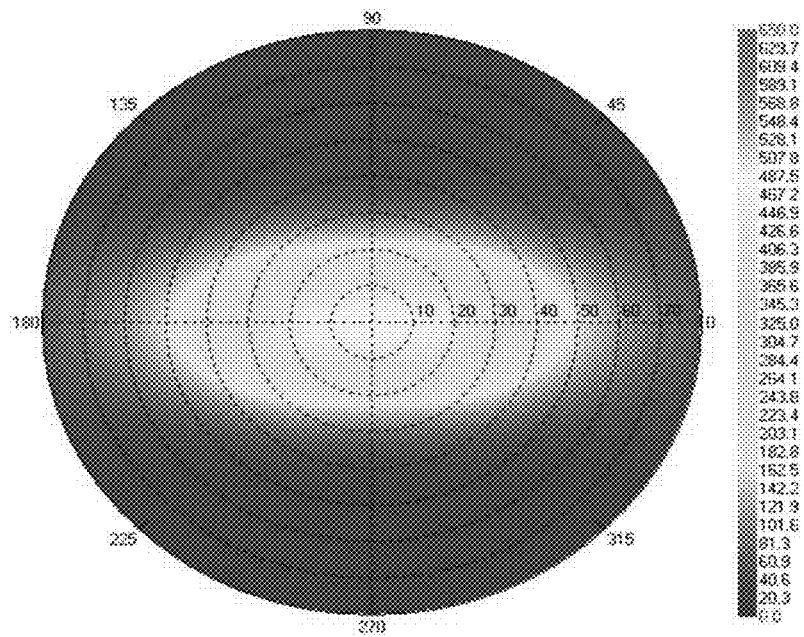
FIGS. 14A and 14B are simulation results of measuring a luminance distribution of a display device according to an embodiment.
Figure 14B:
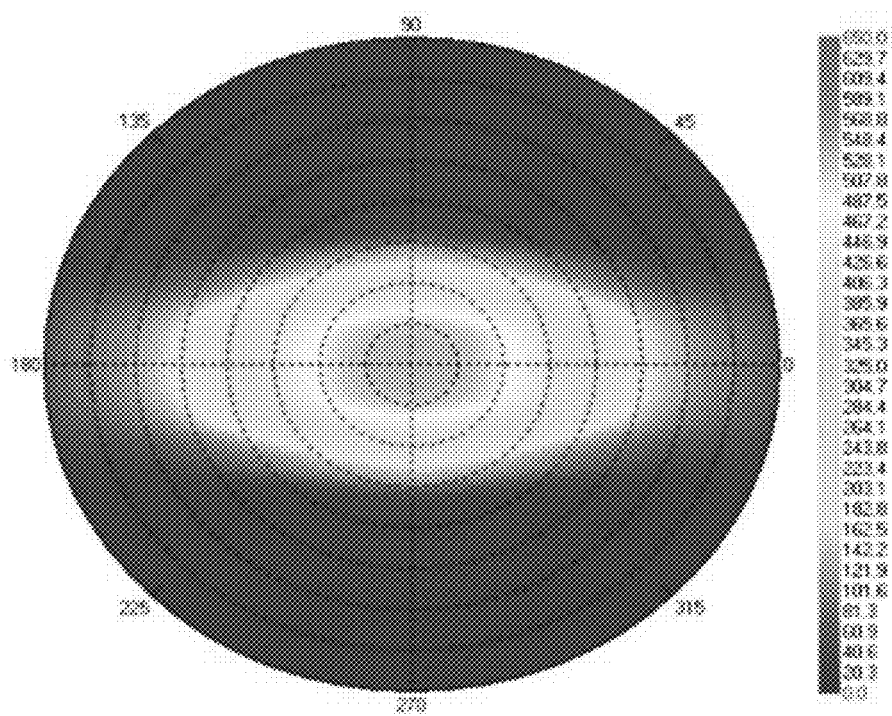
Figure 15:
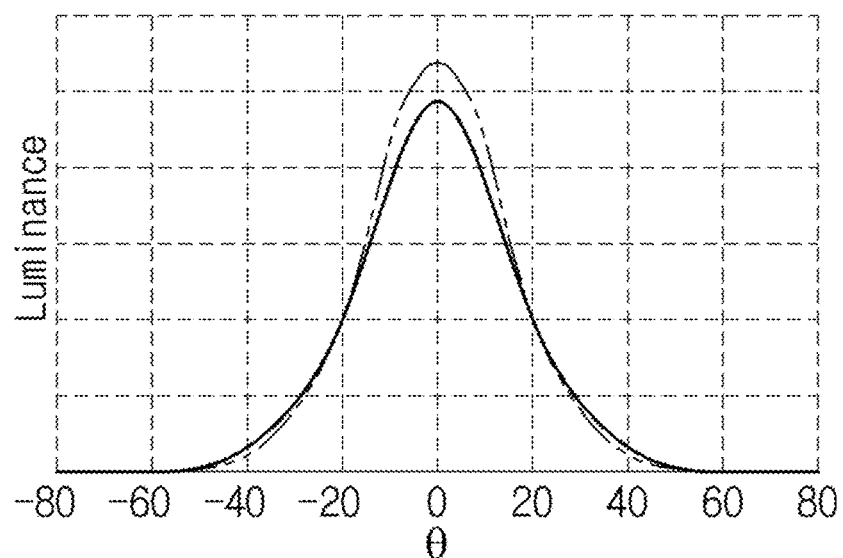
FIG. 15 is a graph illustrating a luminance distribution of a display device according to an embodiment.

FIG. 14 is a simulation result of measuring a luminance distribution of a display device according to an embodiment. FIG. 15 is a graph illustrating a luminance distribution of a display device according to an embodiment.

Referring to FIG. 13 together, the light emitted from the backlight unit 2000 is applied to the display panel 3000 and images are output in an upward direction (front direction) of the display device 1 through the pixels PX1, PX2, and PX3 disposed on the display panel 3000. In the case that the diffractive transmitting layer 120 is not provided, front luminance may be reduced by the light-shielding patterns 111 of the first viewing angle control member 110 as illustrated in FIG. 14A and the lower, solid line of FIG. 15. However, in the case that the diffractive transmitting layer 120 is provided, constructive interference due to diffraction occurs between lights passing through the diffractive transmitting layer 120, and thus the intensity of light emitted to the front may be further increased. As a result, in the case that the diffractive transmitting layer 120 is provided, the front luminance of the display device 1 can be further improved as illustrated in FIG. 14B and the dashed line of FIG. 15. The darker region in the central region of FIG. 14B indicates that more light is being emitted at the central region, as compared to the amount of light emitted in FIG. 14A. Thus, both area of emission and the intensity of emission is increased from FIG. 14A to FIG. 14B, as can be seen comparing the images. The front luminance enhancement effect may appear in both the above-described shared and private modes.

Although the embodiments of the present disclosure have been described above with reference to the accompanying drawings, it will be understood that the technical configuration of the present disclosure may be embodied in other specific forms by those skilled in the art to which the present disclosure pertains without changing the technical spirit or essential features of the present disclosure. Therefore, it should be understood that the embodiments described above are illustrative in all respects and not restrictive. In addition, the scope of the present disclosure is indicated by the claims to be described later rather than by the above detailed description. In addition, all changes or modifications derived from the meaning and scope of the claims and their equivalent concepts should be construed as being included in the scope of the present disclosure.

The light path control device and the display device including the same according to embodiments can induce reinforcement due to the diffraction of light using the diffractive transmitting layer with the slits formed, and as a result, the front luminance can be improved.

In addition, the light path control device and the display device including the same according to embodiments can induce the constructive and offset interferences of the light through the diffractive transmitting layer, thereby improving the light luminance profile.

In addition, the light path control device and the display device including the same according to embodiments can minimize the light loss and maximize the extraction of light by applying a metal material having a high reflectance to the diffractive transmitting layer.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A light path control device, comprising:
a first viewing angle control member including light-shielding patterns positioned at regular intervals;
a pattern cover layer encasing the light-shielding patterns; and
a diffractive transmitting layer disposed on a lower portion of the first viewing angle control member, the diffractive transmitting layer including a plurality of slits.

2. The light path control device of claim 1, wherein the plurality of slits is formed to induce diffraction of light incident on the plurality of slits so that the diffracted lights cause constructive interference.

3. The light path control device of claim 1, wherein one or more slits are disposed between adjacent light-shielding patterns.

4. The light path control device of claim 1, wherein the diffractive transmitting layer includes a metal material that reflects light.

5. The light path control device of claim 4, wherein the diffractive transmitting layer includes:
a reflection layer including the metal material; and
a transmitting layer that is disposed on an upper portion of the reflection layer and includes a light transmitting material.

6. The light path control device of claim 1, wherein the plurality of slits is configured in plan view as at least one of long bars extending in parallel to each other or an extension line shape including one or more bent points.

7. The light path control device of claim 1, further comprising a light transmitting layer disposed between the diffractive transmitting layer and the first viewing angle control member, the light transmitting layer including a light transmitting material.

8. The light path control device of claim 1, further comprising a second viewing angle control member that is formed on an upper portion of the first viewing angle control member and includes a first electrode, a second electrode, and a liquid crystal layer interposed between the first electrode and the second electrode.

9. The light path control device of claim 1, wherein the light-shielding patterns include a colored light absorbing material.

10. The light path control device of claim 9, wherein the light-shielding patterns have a cross-section of at least one of a trapezoidal or an inverted trapezoidal shape that varies a width along a vertical direction.

11. The light path control device of claim 1, wherein the light-shielding patterns include a colored electric responsive particle dispersed in a solution.

12. The light path control device of claim 11, wherein the first viewing angle control member further includes a first electrode disposed on a lower side of the light-shielding patterns; and a second electrode disposed on an upper side of the light-shielding patterns,
the electric responsive particle moves in a direction of the first or second electrode according to an electric field formed between the first electrode and the second electrode.

13. The light path control device of claim 11, wherein the first viewing angle control member further includes a second electrode disposed on an upper side of the light-shielding patterns,
the electric responsive particle moves in a direction of the second electrode according to an electric field formed between the diffractive transmitting layer including a metal material and the second electrode.

14. A display device, comprising:
a substrate;
a backlight unit that is disposed on the substrate and configured to generate light;
a display panel that is disposed on the backlight unit and displays an image using the light provided from the backlight unit; and
a light path control device that is interposed between the backlight unit and the display panel and controls an emission angle of the light incident from the backlight unit and provides the light to the display panel,
wherein the light path control device comprises:
a first viewing angle control member including light-shielding patterns patterned at regular intervals;
a pattern cover layer encasing the light-shielding patterns; and
a diffractive transmitting layer disposed on a lower portion of the first viewing angle control member, the diffractive transmitting layer including a plurality of slits.

15. The display device of claim 14, wherein the plurality of slits is formed to induce diffraction of lights incident to the plurality of slits so that the diffracted lights cause constructive interference.

16. The display device of claim 14, wherein one or more slits are disposed between adjacent light-shielding patterns.

17. The display device of claim 14, wherein the diffractive transmitting layer includes a metal material that reflects light.

18. The display device of claim 17, wherein the backlight unit includes a light source member that generates light, a light guide plate that guides the light generated from the light source member to emit the light in a direction of the display panel, and a reflection layer disposed on a lower portion of the light guide plate,
the light reaching the diffractive transmitting layer in which the slits are not formed from the backlight unit is reflected by the diffractive transmitting layer and proceeds to the reflection layer, and the light reaching the reflection layer is re-reflected and caused to reach the slits.

19. A light path control device, comprising:
a diffractive transmitting layer, the diffractive transmitting layer including a plurality of light blocking members and a plurality of slits between the respective light blocking members;
a pattern cover layer overlying the diffractive transmitting layer;
a plurality of the light-shielding patterns encased within the pattern cover layer, the light-shielding patterns being positioned at regular intervals within the pattern cover letter; and
a plurality of light transmissive regions positioned between the respective plurality of light shielding patterns.

20. The light control device of claim 19 wherein the plurality of the light-shielding patterns are positioned within the pattern cover layer at an upper region thereof and there is light transmissive portion extending fully along a bottom region thereof, or wherein the plurality of the light-shielding patterns are positioned within the pattern cover layer at a lower region thereof and there is light transmissive portion extending fully along a bottom region thereof.

* * * * *